United States Patent
Suzuki et al.

(10) Patent No.: US 8,306,711 B2
(45) Date of Patent: Nov. 6, 2012

(54) SHIFT CONTROL DEVICE FOR VEHICLE AND VEHICLE INCORPORATING SAME

(75) Inventors: Osamu Suzuki, Saitama (JP); Kaoru Hatanaka, Saitama (JP); Syunichi Miyagishi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1123 days.

(21) Appl. No.: 11/901,926

(22) Filed: Sep. 19, 2007

(65) Prior Publication Data

US 2008/0077301 A1 Mar. 27, 2008

(30) Foreign Application Priority Data

Sep. 21, 2006 (JP) .................................. 2006-256006

(51) Int. Cl.
*G06F 7/00* (2006.01)
*G06F 17/00* (2006.01)
*G06F 19/00* (2011.01)

(52) U.S. Cl. ............ 701/65; 701/51; 180/337; 180/338; 477/37; 477/84; 477/85

(58) Field of Classification Search ................ 701/51, 701/55, 65; 180/282, 338; 477/37, 42, 64, 477/80, 84, 89, 91, 120
See application file for complete search history.

(56) References Cited

U.S. PATENT DOCUMENTS

| | | | | |
|---|---|---|---|---|
| 4,827,416 A | * | 5/1989 | Kawagoe et al. | ................ 701/38 |
| 4,870,545 A | * | 9/1989 | Hatanaka et al. | ............. 362/466 |
| 5,410,477 A | * | 4/1995 | Ishii et al. | ........................ 701/48 |
| 5,598,335 A | | 1/1997 | You | |
| 5,681,234 A | * | 10/1997 | Ethington | ........................ 474/70 |
| 6,218,804 B1 | * | 4/2001 | Toriyama et al. | ............. 320/104 |
| 6,564,663 B2 | * | 5/2003 | Rioux et al. | ................ 74/336 R |
| 6,681,196 B2 | | 1/2004 | Glaser et al. | |
| 6,817,265 B2 | * | 11/2004 | Hasegawa et al. | ........... 74/551.1 |
| 7,377,533 B2 | * | 5/2008 | Takeuchi et al. | ............... 280/272 |
| 7,383,917 B2 | * | 6/2008 | Asano | ........................... 180/446 |

(Continued)

FOREIGN PATENT DOCUMENTS

DE 10350047 5/2005

(Continued)

OTHER PUBLICATIONS

Cossalter et al., "A Motorcycle Multi-Body Model for Real Time Simulations Based on the Natural Coordinates Approach", Vehicle System Dynamics, 2002, vol. 37, No. 6. pp. 423-447, Italy.

*Primary Examiner* — Thomas Tarcza
*Assistant Examiner* — Rami Khatib
(74) *Attorney, Agent, or Firm* — Carrier Blackman & Associates, P.C.; William D. Blackman; Joseph P. Carrier

(57) ABSTRACT

A vehicle is provided with a shift control device including a rolling angular velocity sensor for detecting a rolling angular velocity of a component of the vehicle, and a steering-angle angular velocity sensor for detecting a steering-angle angular velocity of a handlebar of the vehicle. The shift control device is operable to inhibit shifting of a gear ratio of a continuously variable transmission during rolling operation of the vehicle when detection signals from the rolling angular velocity sensor and the steering-angle angular velocity sensor respectively are equal to or greater than predetermined reference values.

18 Claims, 3 Drawing Sheets

U.S. PATENT DOCUMENTS

| | | | |
|---|---|---|---|
| 7,578,767 B2 * | 8/2009 | Matsudaira et al. | 477/115 |
| 7,610,131 B2 * | 10/2009 | Kojima | 701/38 |
| 7,647,148 B2 * | 1/2010 | Lu | 701/38 |
| 2004/0098183 A1 | 5/2004 | Nanri | |
| 2004/0098185 A1 * | 5/2004 | Wang | 701/70 |
| 2005/0131604 A1 * | 6/2005 | Lu | 701/38 |
| 2007/0066443 A1 * | 3/2007 | Matsudaira et al. | 477/115 |
| 2008/0004772 A1 * | 1/2008 | Kobayashi | 701/41 |

FOREIGN PATENT DOCUMENTS

| | | |
|---|---|---|
| JP | 2004-116752 | 4/2004 |
| WO | WO/0144020 | 6/2001 |

* cited by examiner

SHIFT CONTROL DEVICE FOR VEHICLE AND VEHICLE INCORPORATING SAME

CROSS-REFERENCE TO RELATED APPLICATIONS

The present application claims priority under 35 USC §119 based on Japanese patent application No. 2006-256006, filed on Sep. 21, 2006. The entire subject matter of this priority document is herein incorporated by reference.

BACKGROUND OF THE INVENTION

1. Field of the Invention

The present invention relates to a shift control device for continuously variable transmission for a vehicle, and a vehicle incorporating same. More particularly, the present invention relates to a shift control device which inhibits shifting of gear ratio of continuously variable transmission during a rolling behavior of a vehicle, such as a motorcycle.

2. Description of the Background Art

There are several known shift control devices which inhibit shifting of a gear ratio of an automatic transmission by detecting a steering angle and a speed of a vehicle. An example of such shift control device is disclosed in Japanese published patent document JP-A-2004-116752.

According to the Japanese published patent document JP-A-2004-116752, as shown in FIGS. 1 and 5 (not included in this disclosure) thereof, a hydrostatic continuously variable transmission 5 includes a drive shaft 8, a fixed capacitance hydraulic pump 6 and a variable capacitance hydraulic motor 7 integrally mounted on the drive shaft 8, and a hydraulic closed circuit formed between the fixed capacitance hydraulic pump 6 and the variable capacitance hydraulic motor 7.

When a driven gear 4 which is meshed with a drive gear 3 mounted on a crankshaft 2 of an internal combustion engine 1 is rotated, the fixed capacitance hydraulic pump 6 is also rotated. This rotational force is outputted to the drive shaft 8. Here, in response to a change of an inclination angle of a movable oblique plate incorporated in the variable capacitance hydraulic motor 7 by an inclination angle control mechanism 10, a shift ratio of the hydrostatic continuously variable transmission 5 is changed.

To be more specific, the above-mentioned inclination angle control of the movable oblique plate is performed by controlling driving of a control motor 11 using an ECU 30.

A vehicle speed signal from a vehicle speed sensor 33 and a steering angle signal from a steering angle sensor 38 mounted on a handlebar are inputted to the ECU 30, which allows the inclination angle control mechanism 10 to change the inclination angle of the movable oblique plate in response to these signals.

When the inputted vehicle speed and steering angle are calculated and a calculation result satisfies predetermined conditions, shifting (shift down) by the hydrostatic continuously variable transmission 5 is inhibited. However, for example, when the rolling behavior during slalom traveling (e.g., zigzag traveling between obstacles) of a vehicle or the like is fast, it is desirable to inhibit the shifting of gear ratio even when the calculation result of the vehicle speed and the steering angle does not satisfy the predetermined conditions.

Accordingly, it is an object of the present invention to provide a shift control device of a vehicle which can restrict shifting of gear ratio during the rolling behavior of a vehicle body i.e., during slalom traveling (including fast traveling) and quickly turning of handlebar of the vehicle.

SUMMARY OF THE INVENTION

In order to achieve the foregoing object, the present invention according to a first aspect provides a shift control device for a vehicle, such as a motorcycle, which controls shifting of gear ratio of an automatic transmission (continuously variable transmission) mounted thereon. The shift control device includes a rolling angular velocity sensor which detects a rolling angular velocity of a vehicle body; and a steering-angle angular velocity sensor which detects an angular velocity of a handlebar of the vehicle. The shift control device inhibits the shifting of gear ratio of the continuously variable transmission when detection signals from the rolling angular velocity sensor and the steering-angle angular velocity sensor are greater than or equal to respective reference values of the rolling angular velocity of the vehicle body and the steering-angle angular velocity of the handlebar.

In other words, the shift control device of the present invention inhibits (restricts) the shifting of the gear ratio when the rolling angular velocity is greater than or equal to the reference value; and when the steering-angle angular velocity is greater than or equal to the reference value.

When the vehicle body rolls fast such that the rolling angular velocity exceeds the reference value of the rolling angular velocity and the handlebar is quickly turned such that the steering-angle angular velocity exceeds the reference value of the steering-angle angular velocity, a change of a driving force of wheels during rolling of vehicle body or steering can be eliminated by inhibiting the shifting of gear ratio (e.g., maintaining then current gear ratio), thus providing smoother and more comfortable turning of the vehicle.

The present invention according to a second aspect, in addition to the first aspect, provides the rolling angular velocity sensor is arranged at a rear portion of the vehicle body (motorcycle). The rolling angular velocity sensor is disposed above a rear wheel of the vehicle.

Since the rolling angular velocity sensor is arranged at a position spaced away from an engine and/or a power unit, the rolling angular velocity sensor is hardly influenced by vibrations generated by the engine during operation of the vehicle.

ADVANTAGE OF THE PRESENT INVENTION

According to the present invention, as described in first aspect, the shift control device includes a rolling angular velocity sensor which detects a rolling angular velocity of a vehicle body and a steering-angle angular velocity sensor which detects a steering-angle angular velocity of a handlebar (also referred as a bar handle) of the vehicle, wherein the shift control device inhibits the shifting of gear ratio when values of detection signals from the rolling angular velocity sensor and the steering-angle angular velocity sensor are greater than or equal to respective reference values. Hence, during rolling or steering of the vehicle body, a change of a driving force on wheels can be eliminated for providing a smoother and more comfortable turning of the vehicle.

Further, according to the present invention, as described in the second aspect, the rolling angular velocity sensor is arranged at a rear portion of the vehicle body and is disposed above a rear wheel of the vehicle. Such arrangement of the rolling angular velocity sensor at a position spaced away from the vehicle engine allows proper functionality of the sensor since it is hardly (minimally) influenced by vibrations of the engine. Accordingly, it is possible to more accurately detect the rolling angular velocity of the vehicle body.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

It should be understood that only structures considered necessary for illustrating selected embodiments of the present invention are described herein. Other conventional structures, and those of ancillary and auxiliary components of the system, will be known and understood by those skilled in the art.

A shift control device for a vehicle (such as a motorcycle) and a vehicle incorporating same according to illustrative embodiments of the present invention is described below in detail with reference to the accompanying drawings.

Figure 1:
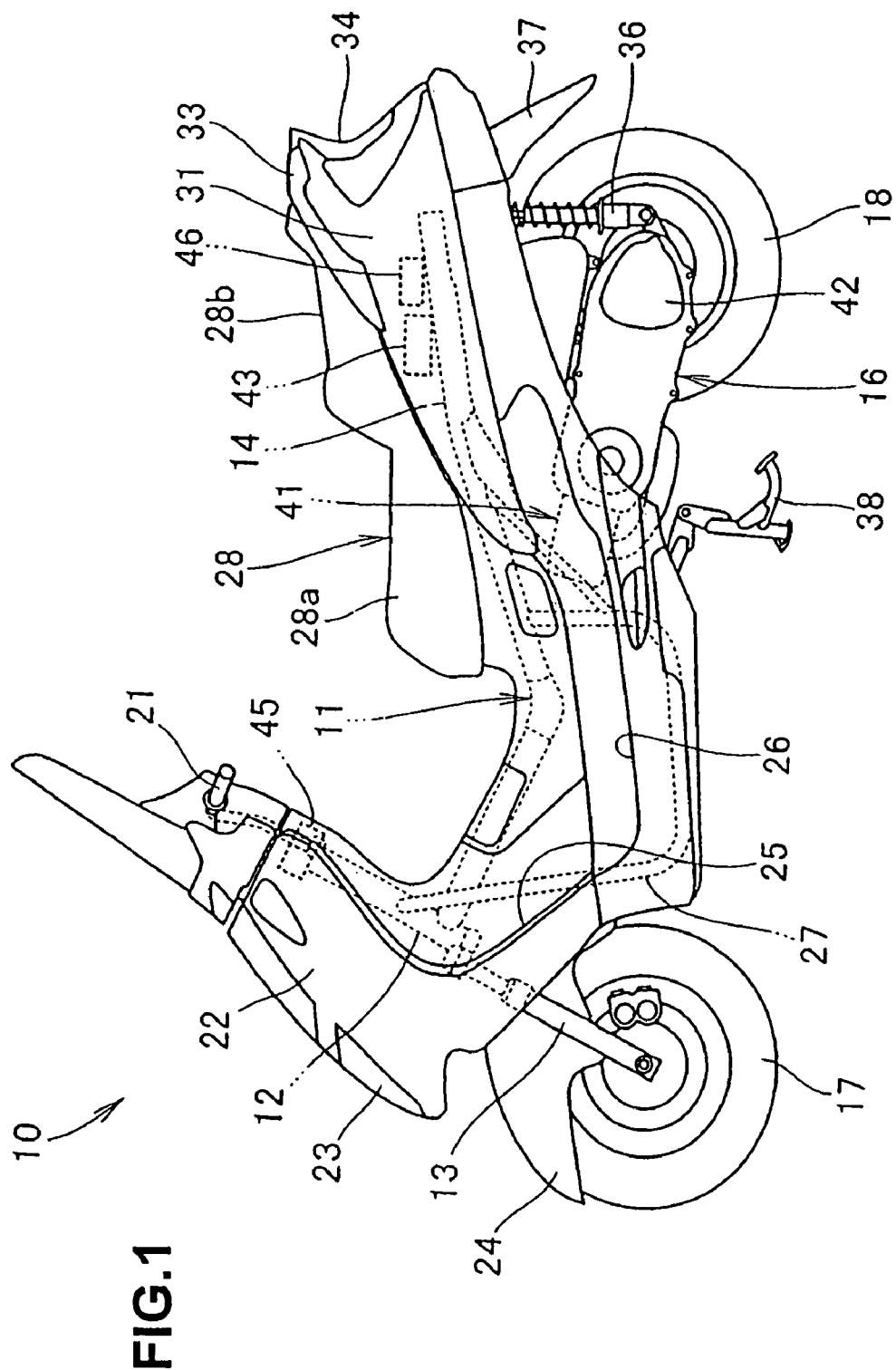
FIG. 1 is a side view of a motorcycle having a shift control device according to the present invention.

FIG. 1 is a side view of a motorcycle having a shift control device according to the present invention. A motorcycle 10 is a scooter-type vehicle in which a front fork 13 is steerably mounted on a head pipe 12 which constitutes a front end of a vehicle body frame 11, a power unit 16 is mounted on a main upper frame 14 (constituting the vehicle body frame 11) which extends rearwardly from the head pipe 12 in a vertically swingable manner, a front wheel 17 is mounted on a lower end of the front fork 13, and a rear wheel 18 is mounted on a rear end of the power unit 16.

As shown in FIG. 1, the motorcycle 10 includes a handlebar 21 joined to the front fork 13, a front cover 22, a head lamp 23, a front fender 24, a leg shield 25, a floor step 26, a lower frame 27 which constitutes the vehicle body frame 11, a tandem seat 28 (including a rider seat 28a and a pillion seat 28b), a side cover 31, a grab rail 33, a rear combination lamp 34, a rear cushion unit 36, a rear fender 37 and a main stand 38.

The power unit 16 includes an engine 41 which forms a front portion of the power unit 16, a continuously variable transmission 42 integrally joined to the engine 41 and extending rearwardly therefrom, and a main control unit 43 which controls the engine 41 and the continuously variable transmission 42 mounted on a rear portion of the main upper frame 14.

The main control unit 43 includes an engine control unit 67 which controls the engine 41 and a shift control unit 58 which controls shifting of gear ratio of the continuously variable transmission 42.

The motorcycle 10 includes a shift control device 50 having the shift control unit 58. The engine control unit 67 and the shift control device 50 having the shift control unit 58 are explained with reference to FIG. 2.

The shift control device 50 further includes a steering-angle angular velocity sensor 45 which detects an angular velocity of a steering angle of the handlebar 21. The steering-angle angular velocity sensor 45 is mounted on an upper portion of the head pipe 12.

The shift control device 50 also includes a rolling angular velocity sensor 46 which detects an angular velocity of rolling of the vehicle body. The rolling angular velocity sensor 46 is arranged on a rear portion of the vehicle body, i.e., the rolling angular velocity sensor is disposed above the rear wheel 18 and mounted on a rear portion of the main upper frame 14.

In other words, the rolling angle angular velocity sensor 46 is disposed at a position spaced away from the engine 41, as shown in FIG. 1.

The shift control device 50 also includes an engine-rotational-speed sensor 51 which detects a rotational speed of the engine; and a vehicle speed sensor 52 which detects a vehicle speed of the vehicle. The shift control unit 58 of the shift control device 50 includes a memory unit 53 which stores a steering-angle angular velocity reference value Sstd and a rolling angular velocity reference value Rstd; and an arithmetic operation unit 54.

The arithmetic unit 54 receives inputs of an engine-rotational-speed signal ES, a vehicle speed signal VS, a steering-angle angular velocity signal SAV and a rolling angular velocity signal RAV which are outputted from the engine-rotational-speed sensor 51, the vehicle speed sensor 52, the steering-angle angular velocity sensor 45 and the rolling angular velocity sensor 46, respectively.

The arithmetic unit 54 performs an arithmetic operations including comparing the steering-angle angular velocity signal SAV with the steering-angle angular velocity reference value Sstd; and comparing the rolling angular velocity signal RAV with the rolling angular velocity reference value Rstd.

The shift control unit 58 also includes an actuator drive unit 56 which receives an arithmetic operation signal SC 1, an arithmetic operation result, generated by the arithmetic operation unit 54. An actuator 57, actuated by the actuator drive unit 56, performs shifting of gear ratio of the continuously variable transmission 42 in response to a drive signal SD from the actuator drive unit 56.

Figure 2:
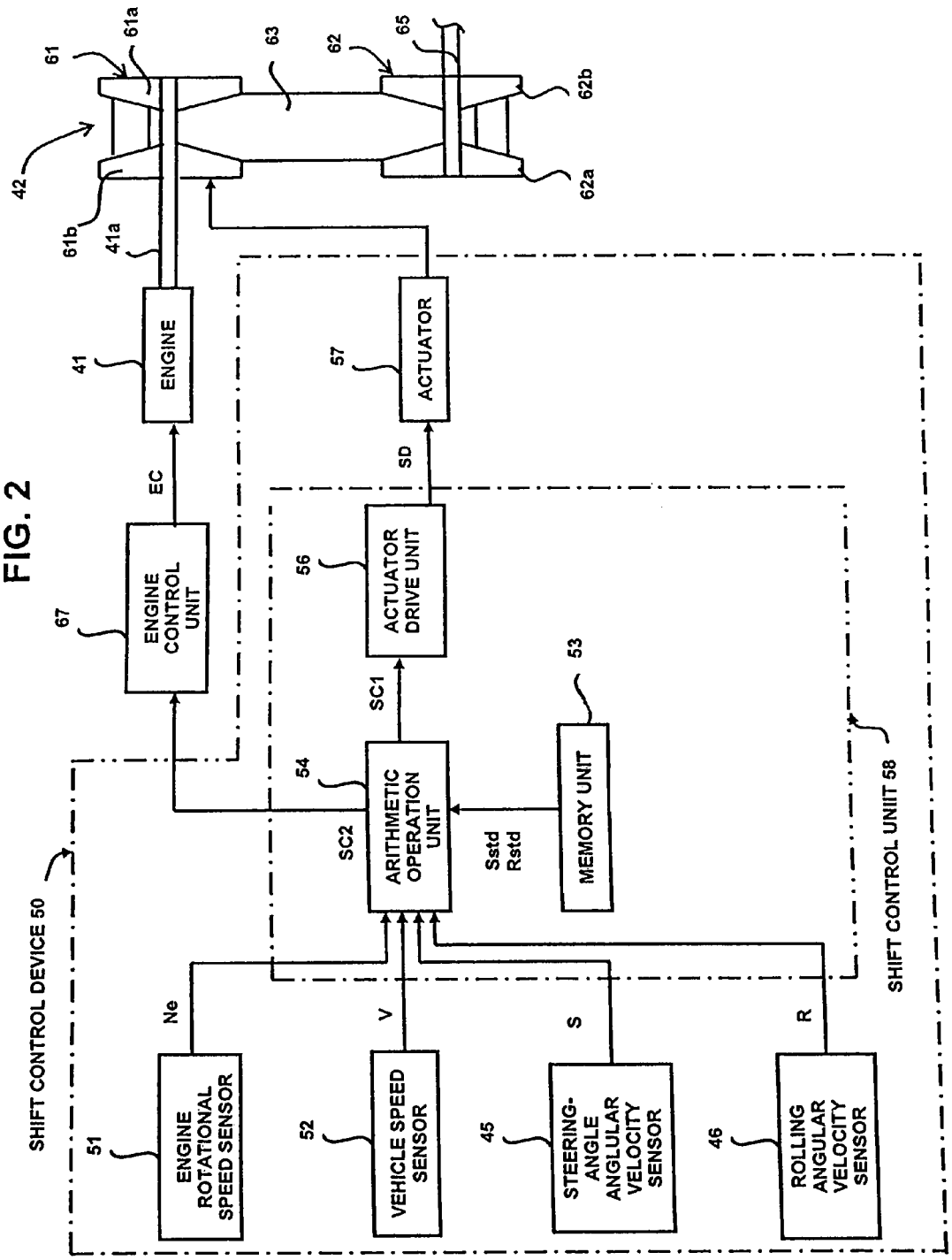
FIG. 2 is a block diagram showing the shift control device according to the present invention.

As shown in FIG. 2, the shift control unit 58 mainly includes the memory unit 53, the arithmetic operation unit 54 and the actuator drive unit 56.

The continuously variable transmission 42 includes a drive pulley 61 which is joined to a crankshaft 41a of the engine 41, a driven pulley 62 which is joined to a side a rear wheel 18 (see FIG. 1), and a belt 63 which respectively spans around the drive pulley 61 and the driven pulley 62.

The drive pulley 61 includes a fixed pulley half body 61a which is integrally mounted on the crankshaft 41a and a movable pulley half body 61b which is movably mounted on the crankshaft 41a such that the movable pulley half body 61b approaches or moves away from the fixed pulley half body 61a. The movable pulley half body 61b is driven by the actuator 57 to move towards or move away from the fixed pulley half body 61a.

The driven pulley 62 includes a fixed pulley half body 62a which is integrally mounted on an output shaft 65 and a movable pulley half body 62b which is movably mounted on the output shaft 65 such that the movable pulley half body 62b moves towards or moves away from the fixed pulley half body 62a in accordance with the operation of drive pulley 61. The output shaft 65 is joined to an axle of the rear wheel 18 via a plurality of gears.

The movable pulley half body 62b is pushed towards the fixed pulley half body 62a by a spring (not shown) by way of a belt 63.

When the movable pulley half body 61b of the drive pulley 61 approaches (moves towards) the fixed pulley half body 61a when actuated by the actuator 57, a groove width of the drive pulley 61 is decreased and a wrapping radius of the belt 63 which is wrapped around the drive pulley 61 is increased. Along with the increase in the wrapping radius of the belt 63, the movable pulley half body 62b of the driven pulley 62 is moved away from the fixed pulley half body 62a against a resilient force of the spring (not shown), and the wrapping radius of the belt 63 which is wrapped around the driven pulley 62 is decreased. Accordingly, a gear ratio (the wrapping radius of the belt on a driven-pulley-62 side/the wrapping radius of the belt on a drive-pulley-61 side) is decreased.

On the other hand, when the movable pulley half body 61b of the drive pulley 61 is moved away from the fixed pulley half body 61a when actuated by the actuator 57, the groove width of the drive pulley 61 is increased and the wrapping radius of the belt 63 on the drive-pulley-61 side is decreased. Along with the decrease of the wrapping radius of the belt 63 on the drive-pulley-61 side, the movable pulley half body 62b of the driven pulley 62 approaches the fixed pulley half body 62a due to the resilient force of the spring, and the wrapping radius of the belt 63 on the driven-pulley-62 side is increased. Accordingly, a gear ratio is increased.

The arithmetic operation unit 54 sends an arithmetic operation signal SC2 (which is a calculation result) to the engine control unit 67, which controls the engine 41 (for example, an engine rotational speed) based on the arithmetic operation signal SC2.

The operation shift control device 50 is discussed below.

The motorcycle 10 according to the present invention is configured to be operable for fast slalom traveling between obstacles. When the motorcycle starts slalom traveling, the arithmetic operation unit 54 confirms whether the engine rotation speed and the vehicle speed are zero or not (that is, whether the vehicle is stopped or not). When it is confirmed that the vehicle is not stopped, a steering-angle angular velocity of the vehicle in such a state is compared with the steering-angle angular velocity reference value Sstd stored in the memory unit 53, and at the same time, the rolling angular velocity is compared with the rolling angular velocity reference value Rstd stored in the memory unit 53.

When the detected steering-angle angular velocity is found greater than or equal the steering-angle angular velocity reference value Sstd; and the detected rolling angular velocity is found greater than or equal to the rolling angular velocity reference value Rstd, the arithmetic operation unit 54 sends the arithmetic operation signal SC1 to the actuator drive unit 56, which then sends the drive signal SD to the actuator 57 to maintain the position of the movable pulley half body 61b of the drive pulley 61 so as to inhibit shifting (changing) of the gear ratio.

Accordingly, the groove width of the drive pulley 61 is not changed and the shifting of the gear the continuously variable transmission 42 is not performed so that the gear ratio is maintained. For example, even when the throttle opening of the intake device is changed, only the engine rotational speed is changed resulting only in change in vehicle speed and not in change in the gear ratio, i.e., the gear ratio is maintained.

In contrast, in a conventional system, when the shifting of the gear ratio of the continuously variable transmission 42 is performed during slalom traveling, a driving force of the rear wheel 18 is changed. As a result, a smooth and comfortable turning operation of the vehicle is may not be achieved.

According to the present invention, as described above, when the vehicle is rolling at a faster speed (a rolling speed above a threshold value) and the steering of the handlebar is quickly turned during slalom traveling of the vehicle (motorcycle), by performing an operation controlling inhibiting the shifting of the gear ratio of the continuously variable transmission 42, the change of the driving force of the rear wheel attributed to the shifting can be eliminated thereby realizing smoother and more comfortable traveling of the vehicle.

Figure 3:
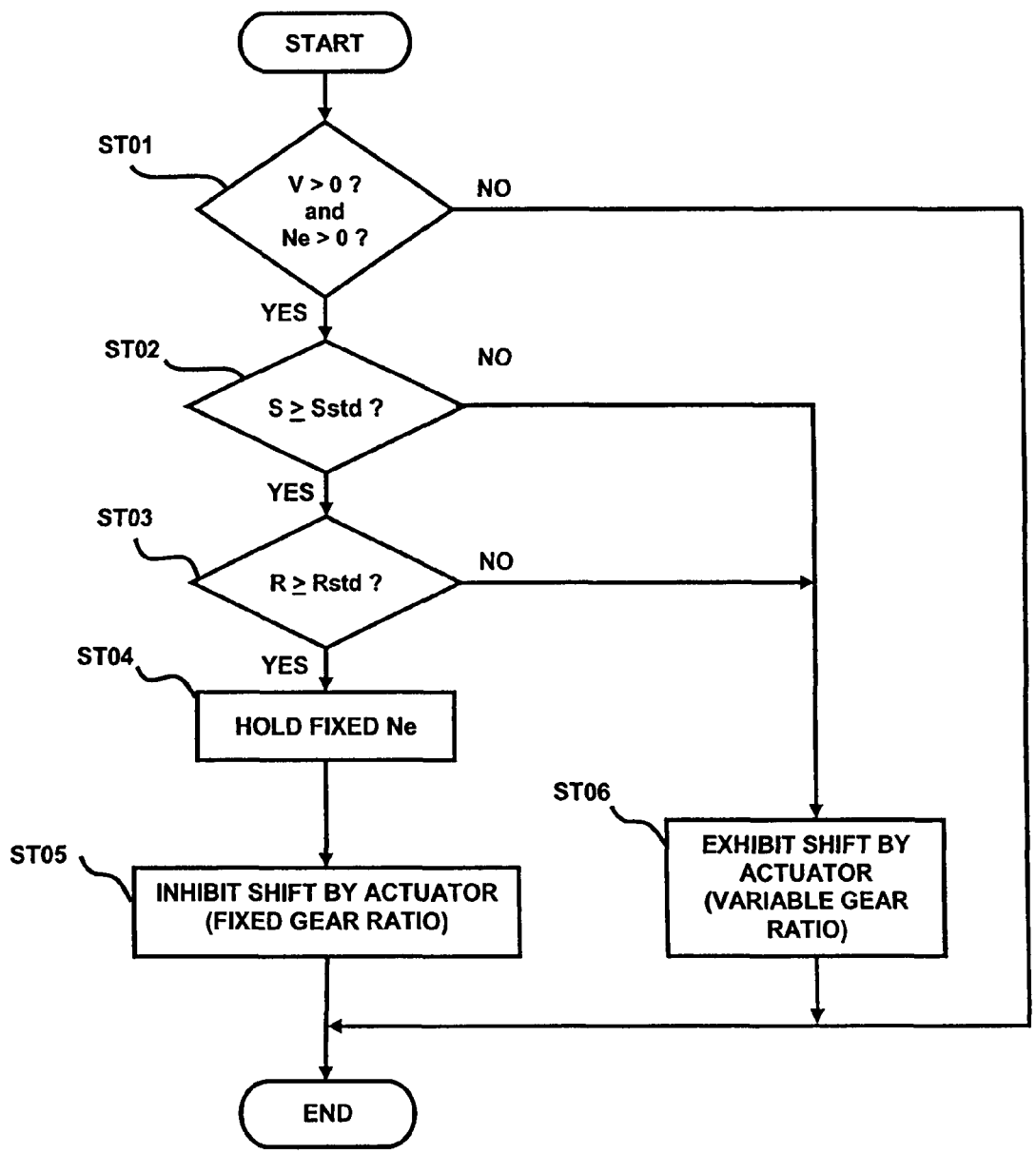
FIG. 3 is a flowchart of a shift control operation performed by the shift control device according to the present invention.

FIG. 3 is a flowchart of a shift control operation performed by the shift control device according to the present invention. In the drawing FIG. 3, symbol STXX indicates a step number, i.e., ST stands for a step and XX stands for a number.

In the first step ST01, it is determined whether the vehicle speed V has a positive value (e.g., V>0) or not; and whether the engine rotational speed has a positive value (e.g., Ne>0) or not.

If both the vehicle speed is greater than zero, i.e., V>0; and the engine rotational speed is greater than zero, i.e., Ne>0, the processing advances to a second step ST02.

In the first step ST 01, if V☐0 and Ne☐0, that is, if the vehicle speed V=0 and the engine rotational speed Ne=0 (e.g., the motorcycle being in a stopped state), processing is terminated.

In the step ST02, it is determined whether the steering-angle angular velocity S is greater than or equal to the steering-angle angular velocity reference value Sstd, i.e., whether S≧Sstd or not.

If the steering-angle angular velocity S is greater than or equal to the steering-angle angular velocity reference value Sstd, i.e., S≧Sstd, processing advances to the step ST03.

If S☐Sstd, that is, if the steering-angle angular velocity S is less than the steering-angle angular velocity reference value Sstd, i.e., if S<Sstd, processing advances to step ST06.

In the step ST03, it is determined whether the rolling angular velocity R is greater than or equal to the rolling angular velocity reference value Rstd, i.e., whether R≧Rstd or not.

If the rolling angular velocity R is greater than or equal to rolling angular velocity reference value Rstd, i.e., R≧Rstd, processing advances to the step ST04.

If R☐Rstd, that is, the rolling angular velocity R is less than rolling angular velocity reference value, i.e., if R<Rstd, processing advances to step ST06.

In the step ST04, the engine rotational speed Ne is held at a fixed value.

In step ST05, by inhibiting the shifting of gear ratio using the actuator, the gear ratio is maintained.

In step ST06, by executing the shifting of the gear ratio using the actuator, the gear ratio is changed.

With the above-mentioned steps, the shift control by the shift control device 50 is completed.

As described above, by inhibiting the shifting of the gear ratio and holding the engine rotational speed Ne at the fixed value, it is possible to further reduce a driving manipulation load imposed on a rider of the vehicle.

As discussed hereinabove in conjunction with FIG. 1 and FIG. 2, the present invention is firstly characterized in that, in the shift control device 50 which controls the shifting of the gear ratio of continuously variable transmission 42, which is mounted on the motorcycle 10 as the automatic transmission. The shift control device 50 includes the rolling angular velocity sensor 46 which detects the rolling angular velocity R of the vehicle body and the steering-angle angular velocity sensor 45 which detects the steering-angle angular velocity S of the handlebar 2. The shift control device 50 inhibits the shifting when values of detection signals from the rolling angular velocity sensor 46 and the steering-angle angular velocity sensor 45 are greater than or equal to respective rolling angular velocity reference value Rstd and the steering-angle angular velocity reference value Sstd.

In this manner, the change of the driving force of wheel during rolling of the vehicle and/or acute sudden steering of the handlebar of the vehicle can be eliminated thereby realizing the smoother and more-comfortable traveling of the vehicle.

The present invention is secondly characterized in that the rolling angular velocity sensor 46 is arranged on the rear portion of the vehicle body and disposed above the rear wheel 18.

Due to such a constitution, the rolling angular velocity sensor 46 is arranged at the position spaced away (remote) from the engine 41. Hence, the rolling angular velocity sensor 46 is hardly influenced, i.e., is affected minimally, by vibrations generated by the engine 41. Accordingly, it is possible to detect the rolling angular velocity of the vehicle body with higher accuracy.

Here, in the embodiment, as shown in FIG. 2, the engine control unit 67 is configured such that the engine control unit 67 sets the throttle opening of the intake device to the fixed value, for example, sets the rolling angular velocity of the engine 41 to the fixed value based on the arithmetic operation signal SC2 from the arithmetic operation unit 54.

However, the present invention is not limited to the above-mentioned embodiments. For example, as in the case in which the throttle valve is quickly opened, when an opening change ratio of the throttle opening exceeds a predetermined value, a control for suppressing the behavior of the vehicle by decreasing an increase rate of the engine rotational speed to a fixed rate may be performed.

INDUSTRIAL APPLICABILITY

The shift control device of the present invention is applicable to a vehicle such as a motorcycle or the like.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. In a two wheeled saddle-type vehicle having a steering handle, the improvement comprising a shift control device for controlling a gear ratio of a continuously variable automatic transmission mounted on the vehicle, said shift control device comprising:
   a rolling angular velocity sensor configured to detect a rolling angular velocity of a body of the vehicle during vehicle operation; and
   a steering-angle angular velocity sensor configured to detect a steering-angle angular velocity of the steering handle of the vehicle;
   wherein the vehicle is configured to be operable for fast slalom traveling between obstacles;
   and wherein the shift control device is configured to inhibit shifting of a gear ratio of the continuously variable automatic transmission when values of detection signals from the rolling angular velocity sensor and the steering-angle angular velocity sensor are greater than or equal to respective reference values.

2. A shift control device according to claim 1, wherein the rolling angular velocity sensor is disposed at a position above a rear wheel at a rear portion of the vehicle.

3. A shift control device according to claim 1, further comprising a memory unit configured to store said references values of the rolling angular velocity and the steering-angle angular velocity.

4. A shift control device according to claim 1, further comprising an arithmetic operation unit configured to receive values of said detection signals; and compares said values of respective detection signals with said respective reference values.

5. A shift control device according to claim 1, wherein said rolling angular velocity sensor is disposed at a position spaced away from a power unit of the vehicle.

6. A motorcycle comprising said shift control device of claim 1.

7. In a two wheeled saddle-type vehicle having a steering handle, the improvement comprising a shift control device for controlling a gear ratio of a continuously variable transmission mounted on the vehicle, said shift control device comprising:
   a rolling angular velocity sensor configured to detect a rolling angular velocity of a body of the vehicle during vehicle operation; and
   a steering-angle angular velocity sensor configured to detect a steering-angle angular velocity of the steering handle of the vehicle;
   wherein the vehicle is configured to be operable for fast slalom traveling between obstacles;
   and wherein the shift control device maintains a gear ratio when values of detection signals from the rolling angular velocity sensor and the steering-angle angular velocity sensor are greater than or equal to respective reference values.

8. A shift control device according to claim 7, wherein the rolling angular velocity sensor is disposed at a position spaced away from an engine of the vehicle.

9. A shift control device according to claim 7, wherein said vehicle is a motorcycle.

10. A shift control device according to claim 9, wherein said rolling angular velocity sensor is disposed at a position spaced away from an engine of the vehicle.

11. A shift control device according to claim 7, further comprising a memory unit configured to store said reference values of the rolling angular velocity and the steering-angle angular velocity.

12. A shift control device according to claim 7, further comprising an arithmetic operation unit configured to receive values of said detection signals; and compare said values of respective detection signals with said respective reference values.

13. In a two wheeled saddle-type vehicle having a steering handle and a power unit including an engine and a continuously variable transmission joined to the engine, the improvement comprising a shift control device comprising:
   an engine rotation speed sensor configured to detect rotational speed of the engine;
   a vehicle speed sensor configured to detect traveling speed of the vehicle;
   a rolling angular velocity sensor configured to detect a rolling angular velocity of a body of the vehicle during vehicle operation; and
   a steering-angle angular velocity sensor configured to detect a steering-angle angular velocity of a steering handle of the vehicle;
   wherein the vehicle is configured to be operable for fast slalom traveling between obstacles;
   and wherein, when detection signals from the rolling angular velocity sensor and the steering-angle angular velocity sensor are greater than or equal to respective reference values, and when each of the rotational speed of the engine and traveling speed of the vehicle has a positive value, the shift control device temporarily inhibits shifting of a gear ratio of the continuously variable transmission.

14. A shift control device according to claim 13, wherein said rolling angular velocity sensor is mounted at a position spaced away from the power unit.

15. A shift control device according to claim 13, wherein said power unit is disposed at a front portion of a vehicle body and said rolling angular velocity sensor is disposed at a rear portion of the vehicle body.

16. A shift control device according to claim 13, further comprising an arithmetic operation unit configured to compare values of said respective detection signals with said respective reference values.

17. A shift control device according to claim 13, further comprising an actuator drive unit which is configured to inhibit shifting of said gear ratio.

18. A shift control device according to claim 17, wherein said actuator drive unit inhibits shifting of said gear ratio irrespective of said rotational speed of the engine.

* * * * *